UNITED STATES PATENT OFFICE.

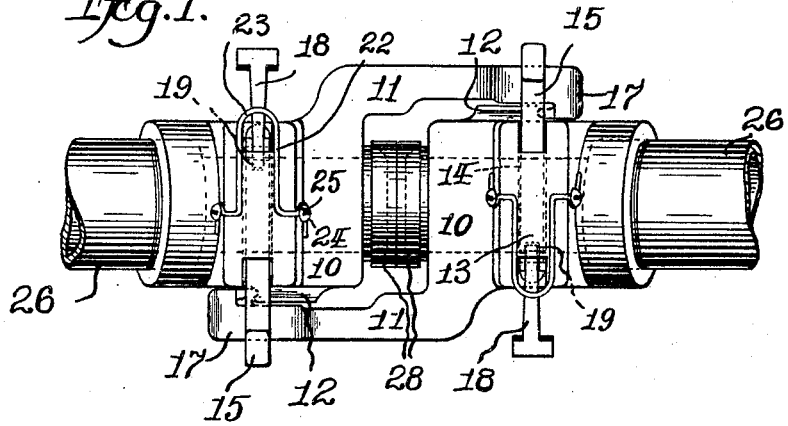
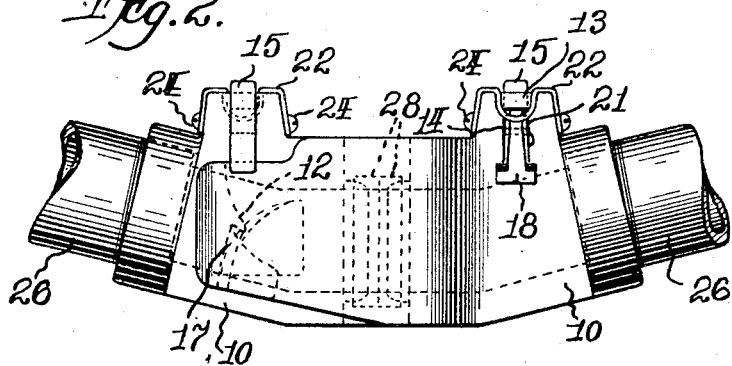

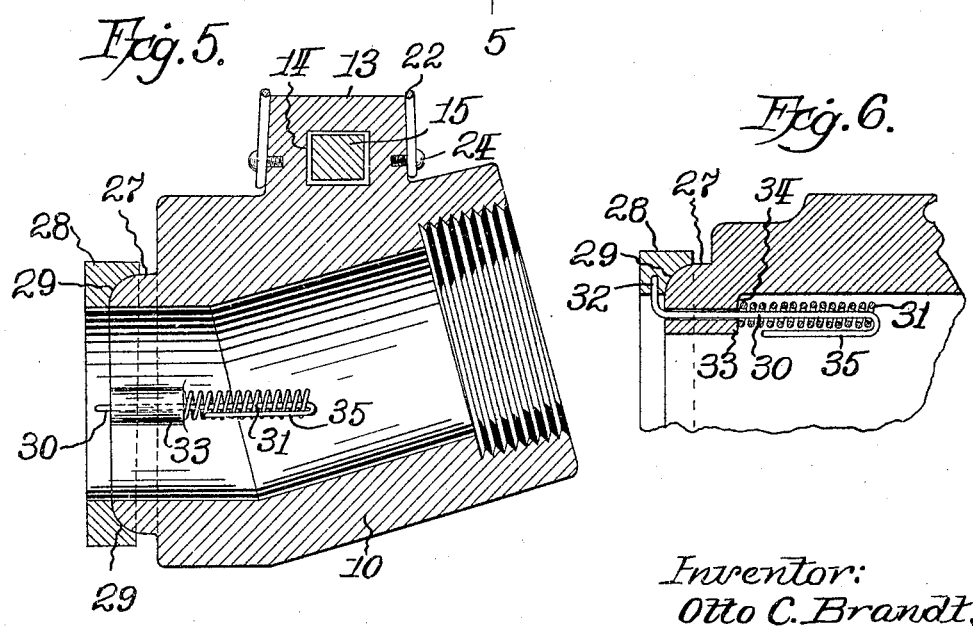

OTTO C. BRANDT, OF ST. PAUL, MINNESOTA.

HOSE-COUPLING.

1,333,791. Specification of Letters Patent. Patented Mar. 16, 1920.

Application filed July 10, 1919. Serial No. 309,898.

*To all whom it may concern:*

Be it known that I, OTTO C. BRANDT, a citizen of the United States, residing in St. Paul, in the county of Ramsey and State of Minnesota, have invented new and useful Improvements in Hose-Couplings, of which the following is a specification.

My invention relates to improvements in hose-couplers.

My object is to produce an efficient hose-coupler particularly adapted to connect steam hose between cars in railway train heating plants.

A further object is to provide locking mechanism for such a coupler which shall secure a steam-tight joint and prevent accidental disengagement of the coupler.

A further object is to produce a coupler which shall be durable and insure against leaks.

In the drawings Figure 1 is a perspective view of my improved coupler. Fig. 2 is a side view of the same. Fig. 3 is a detail partly in section showing the key in locked position. Fig. 4 is a similar view showing the key in unlocked position. Fig. 5 is a section of the line 5—5 of Fig. 4 and Fig. 6 is a sectional detail illustrating the means by which the steam gasket is held in place on a coupler head.

Each half of my device comprises a head 10, provided with the usual side wing 11 adapted to engage the usual lug 12 of the companion member of the coupler. These engaging means are brought together by the usual tilting movement and are formed to co-act with any standard coupler, so that it is not necessary that both cars to be coupled should be provided with my locking device.

On the top of the head 10 I form a boss 13, provided with an aperture 14 adapted to slidably receive and form a housing for the key 15. This housing is so positioned that the locking surface 16 of the key will be above the lug 12 and adapted to form a sliding engagement with the registering end 17 of the wing 11 of the companion head. It will be noted that the locking surface 16 of the key is tapered so that when driven into its housing it will force the end 17 of the wing 11 of the mating coupler inward and down, instead of outward as in some devices now in common use. On the inner end of the key 15 I hinge an extension 18 by inserting the end thereof in a slot 19 formed in said key and connecting the parts by means of a pintle 20. The sides of the extension 18 are slightly tapered outward so that when the key proper is driven home in locking position said extension may drop into a wedge shaped slot or groove 21 formed in the top of the head 10 in line with the aperture 14 in the boss 13. This arrangement furnishes a secure lock for the key 15 when the coupler is engaged as shown in Fig. 3, because the extension 18 wedges itself into said slot so that the key proper cannot be withdrawn without first lifting the extension. To insure the depression of the key extension 18 into the groove 21 I provide a spring 22 (which is preferably U shaped in plan) arranged so that its looped center 23 prevents the upward tilting of the extension. This spring is attached to the head 10 by means of the screws 24, and its curled ends 25 form bearings against the top of the head on either side of the boss 13. The key 15 may be loosened from locked position by striking a blow on the end of the extension 18 or on the head 15' of the key itself, after which the key may be withdrawn and swung up on its hinge so as to permit the disengagement of the wing 11 of one coupling member from the lug 12 of the other.

One end of the head 10 is formed with internal threads to receive the hose 26 and the other end terminates in an annular convex flange 27 to serve as a seat for the gasket 28, which has an annular concave mating surface 29, conforming to the curvature of the convex flange 27. This concave surface of the gasket is held in spring engagement with the convex surface of the flange 27 by a pair of rods 30 and coiled springs 31, which are arranged as follows: The outer end 32 of each rod is bent at substantially right angles to its body portion and fixed in a perforation formed in the inner periphery of the gasket 28 (see Fig. 6); the body portion of said rod then passes through a perforated boss 33 formed in the flange 27 and also through the center of the coil spring 31, which has a bearing at one end against an internal annular shoulder 34 formed in the head, while a loop 35 formed in the rod 32 maintains the spring in resilient engagement with said shoulder 34. As a result of this arrangement the gasket 28 is held in snug engagement with the head 10, but is permitted by the resiliency of the spring 31 to tilt slightly on the convex annular flange 27, so that it may make a steam-tight union with the impinging surface of the gasket on the companion coupler. This arrangement also protects the coupler heads from friction and abrasion due to impact of the coupler heads, which in other constructions frequently cause leaks.

Having described my invention, what I claim as new and desire to protect by Letters Patent is:

1. In a coupling the combination of a pair of coupler heads each formed with a side wing and lug, and a hinged key slidably mounted on the top of each coupler head, one joint of said key having a downwardly enlarged end adapted to engage the wing of the companion coupler head, the other joint being tapered and adapted to fall into and be held in a slot in the head to which said key is attached.

2. In a coupling the combination of a pair of coupler heads each formed with a side wing on one side, a lug on the other, and a hinged key slidably mounted on the top thereof, one end of said key being adapted to engage the wing of the companion coupler head and the other being formed to engage a groove in the head to which said key is attached.

3. A coupler comprising a pair of identical coupler heads each of which is provided with a side wing and a lug and formed with a housing on the top thereof, a key adapted to slide in said housing and engage the wing of the companion coupler, a wedge shaped slot formed in each head in alinement with said housing and a hinged extension on said key adapted to be held in said slot and thereby maintain said key in engagement with the wing of said companion coupler.

4. A coupler comprising two identical coupler heads each formed with a wing and lug for engagement with the companion coupler head, the outer face of each head being formed by a convex annular flange projecting beyond the other surfaces of the head, a gasket formed with a concave inner surface adapted to cover said face and protect it from wear and a resilient connection holding said gasket upon said face.

5. A coupler comprising a pair of identical coupler heads each of which is provided with a wing on one side, a lug on the other and a housing having a key slide-way on the top thereof, a key adapted to slide in said housing and engage the wing of the companion coupler, a wedge shaped slot formed in each head in alinement with said slideway and a hinged extension on said key adapted to be held in said slot and thereby maintain said key in engagement with the wing of said companion coupler.

6. A coupler comprising two identical coupler heads each formed with a wing and lug for engagement with the companion head, a key arranged to slide in the top of each head and engage the wing on said companion head, the outer extremity of each head being convex, a gasket formed with a concave annular recess adapted to cover said extremity and protect it from abrasion and resilient means connecting said gasket with said head.

7. A coupler comprising two identical coupler heads each formed with a longitudinal bore and a wing and lug for engagement with the companion head, a convex annular flange surrounding one end of said bore, a gasket formed with a concave annular recess adapted to fit said flange, and means comprising a rod and spiral spring, resiliently connecting said gasket with said flange.

In witness whereof, I have hereunto subscribed my name to this specification.

OTTO C. BRANDT.

Witnesses:
E. T. PETERSON,
J. E. STRYKER.